United States Patent
Narendran et al.

(10) Patent No.: US 10,674,520 B1
(45) Date of Patent: Jun. 2, 2020

(54) WIRELESS USER DEVICE COMMUNICATIONS OVER OPTIMAL WIRELESS COMMUNICATION CHANNELS

(71) Applicant: Sprint Communications Company L.P., Overland Park, KS (US)

(72) Inventors: Rajveen Narendran, Olathe, KS (US); Ravi Varma Kallepalli, Overland Park, KS (US); Ryan P. Dreiling, Shawnee, KS (US); Christopher Bailey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 344 days.

(21) Appl. No.: 15/610,385

(22) Filed: May 31, 2017

(51) Int. Cl.
| | |
|---|---|
| *H04W 4/00* | (2018.01) |
| *H04W 72/08* | (2009.01) |
| *H04W 24/10* | (2009.01) |
| *H04L 5/00* | (2006.01) |
| *H04B 7/06* | (2006.01) |
| *H04W 24/02* | (2009.01) |
| *H04W 88/02* | (2009.01) |

(52) U.S. Cl.
CPC ........ *H04W 72/085* (2013.01); *H04B 7/0639* (2013.01); *H04L 5/0057* (2013.01); *H04W 24/02* (2013.01); *H04W 24/10* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 8,229,432 B2 | 7/2012 | Fox et al. | |
| 8,600,436 B2 | 12/2013 | Haartsen | |
| 2008/0051037 A1* | 2/2008 | Molnar | H04B 7/0632 455/70 |
| 2008/0268785 A1* | 10/2008 | McCoy | H04B 7/0417 455/67.11 |
| 2009/0042582 A1 | 2/2009 | Wang et al. | |
| 2010/0112952 A1* | 5/2010 | Molnar | H01Q 1/246 455/63.1 |
| 2012/0026941 A1 | 2/2012 | Ahmad et al. | |
| 2012/0039284 A1 | 2/2012 | Barbieri et al. | |
| 2012/0113831 A1 | 5/2012 | Pelletier et al. | |
| 2012/0140743 A1 | 6/2012 | Pelletier et al. | |
| 2013/0107782 A1* | 5/2013 | Anas | H04W 72/1231 370/311 |
| 2013/0324112 A1 | 12/2013 | Jechoux et al. | |
| 2014/0056275 A1* | 2/2014 | Behnamfar | H04W 72/085 370/330 |
| 2014/0153390 A1 | 6/2014 | Ishii et al. | |

(Continued)

*Primary Examiner* — Phirin Sam

(57) ABSTRACT

A wireless user device exchanges data with wireless networks over wireless channels and measures communication metrics for the wireless channels. The wireless user device transfers the communication metrics to other wireless user devices and receives other communication metrics from the other wireless user devices. The wireless user device processes the communication metrics to select an optimal set of communication channels. The wireless user device disables the unselected ones of the wireless channels. The wireless user device exchanges wireless data with the wireless networks over the optimal set of wireless communication channels.

16 Claims, 5 Drawing Sheets

(56) References Cited

U.S. PATENT DOCUMENTS

| | | | |
|---|---|---|---|
| 2015/0078284 A1* | 3/2015 | Lee | H04L 1/0026 |
| | | | 370/329 |
| 2015/0085829 A1* | 3/2015 | Bawaskar | H04W 36/26 |
| | | | 370/332 |
| 2015/0092583 A1* | 4/2015 | Balraj | H04L 1/0003 |
| | | | 370/252 |
| 2015/0312015 A1* | 10/2015 | Chen | H04L 1/0026 |
| | | | 370/329 |
| 2016/0330660 A1* | 11/2016 | Wong | H04B 17/318 |
| 2017/0135121 A1* | 5/2017 | Eyuboglu | H04W 72/12 |
| 2017/0331670 A1* | 11/2017 | Parkvall | H04W 52/0274 |
| 2018/0041943 A1* | 2/2018 | Visuri | H04L 12/145 |
| 2018/0270815 A1* | 9/2018 | Bala | H04W 16/14 |
| 2018/0317146 A1* | 11/2018 | Fitzpatrick | H04W 36/04 |

* cited by examiner

WIRELESS USER DEVICE COMMUNICATIONS OVER OPTIMAL WIRELESS COMMUNICATION CHANNELS

TECHNICAL BACKGROUND

Data communication networks serve user communication devices with user data services like internet access, media conferencing, machine communications, social networking, and the like. To extend the range and mobility of these user data services, the data communication networks deploy wireless access networks. The wireless access networks have wireless access points that communicate over the air with wireless user devices. The wireless access points also communicate over data links with access gateways. A single access gateway usually serves multiple wireless access points.

The wireless access points communicate with the wireless user devices over wireless communication bands that have wireless communication channels. The wireless communication bands typically occupy the Giga-Hertz (GHz) spectrum, and an individual wireless communication channel is usually several Mega-Hertz (MHz) wide. The wireless user devices directly measurement communication metrics like signal strength and quality. The wireless user devices select the wireless communication bands and channels to use based on the best current signal strength and quality.

The wireless networking environment is undergoing a rapid deployment of new wireless communication bands and channels. Mobile wireless user devices may not efficiently process their direct current communication metrics to identify the optimal wireless channels. Mobile wireless user devices do not effectively use optimal wireless communication channels in this complex wireless networking environment.

TECHNICAL OVERVIEW

A wireless user device exchanges data with wireless networks over wireless channels and measures communication metrics for the wireless channels. The wireless user device transfers the communication metrics to other wireless user devices and receives other communication metrics from the other wireless user devices. The wireless user device processes the communication metrics to select an optimal set of communication channels. The wireless user device disables the unselected ones of the wireless channels. The wireless user device exchanges wireless data with the wireless networks over the optimal set of wireless communication channels.

DETAILED DESCRIPTION

Figure 1:
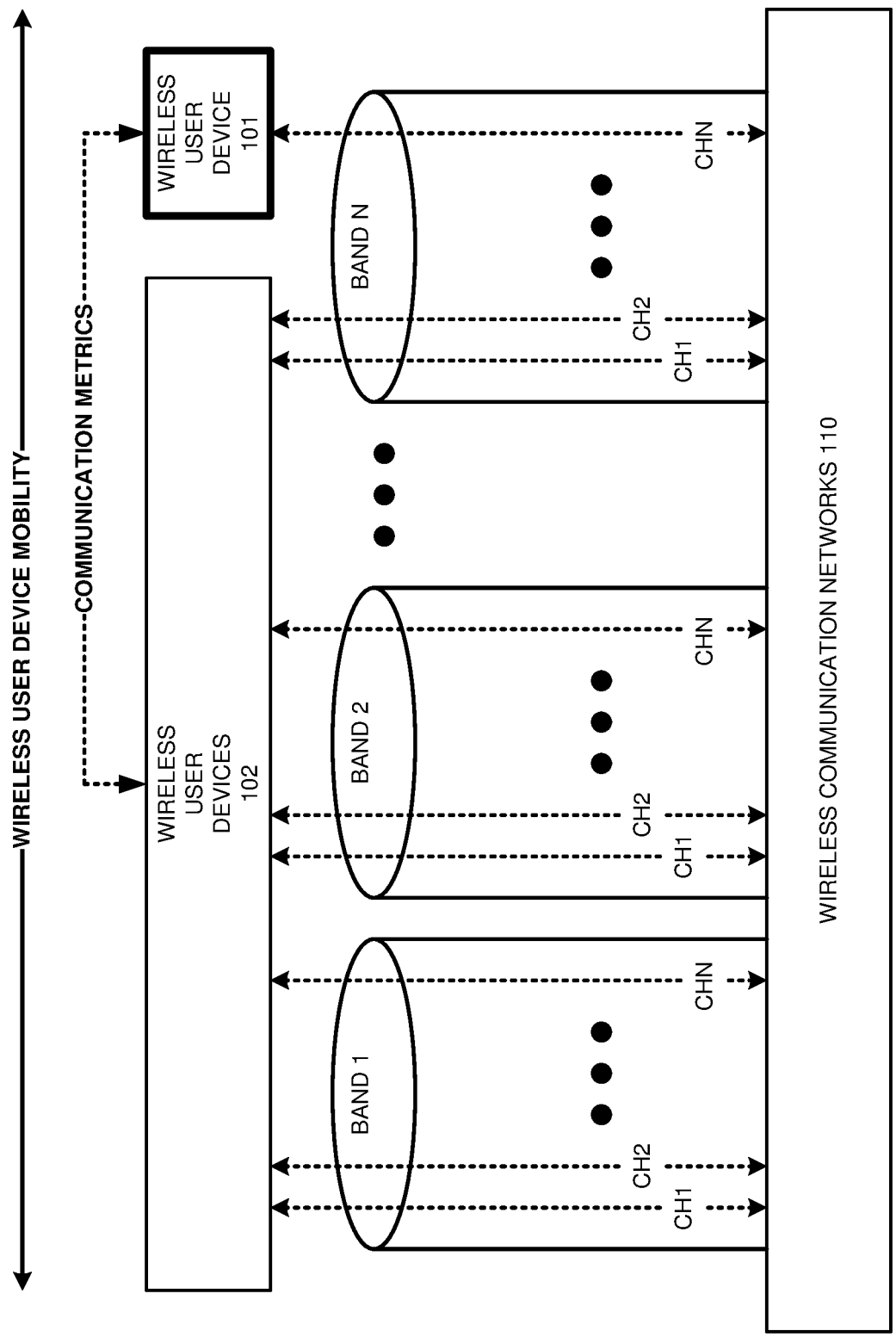
FIGS. 1-3 illustrate a wireless user device to communicate over an optimal set of wireless communication channels.
Figure 2:
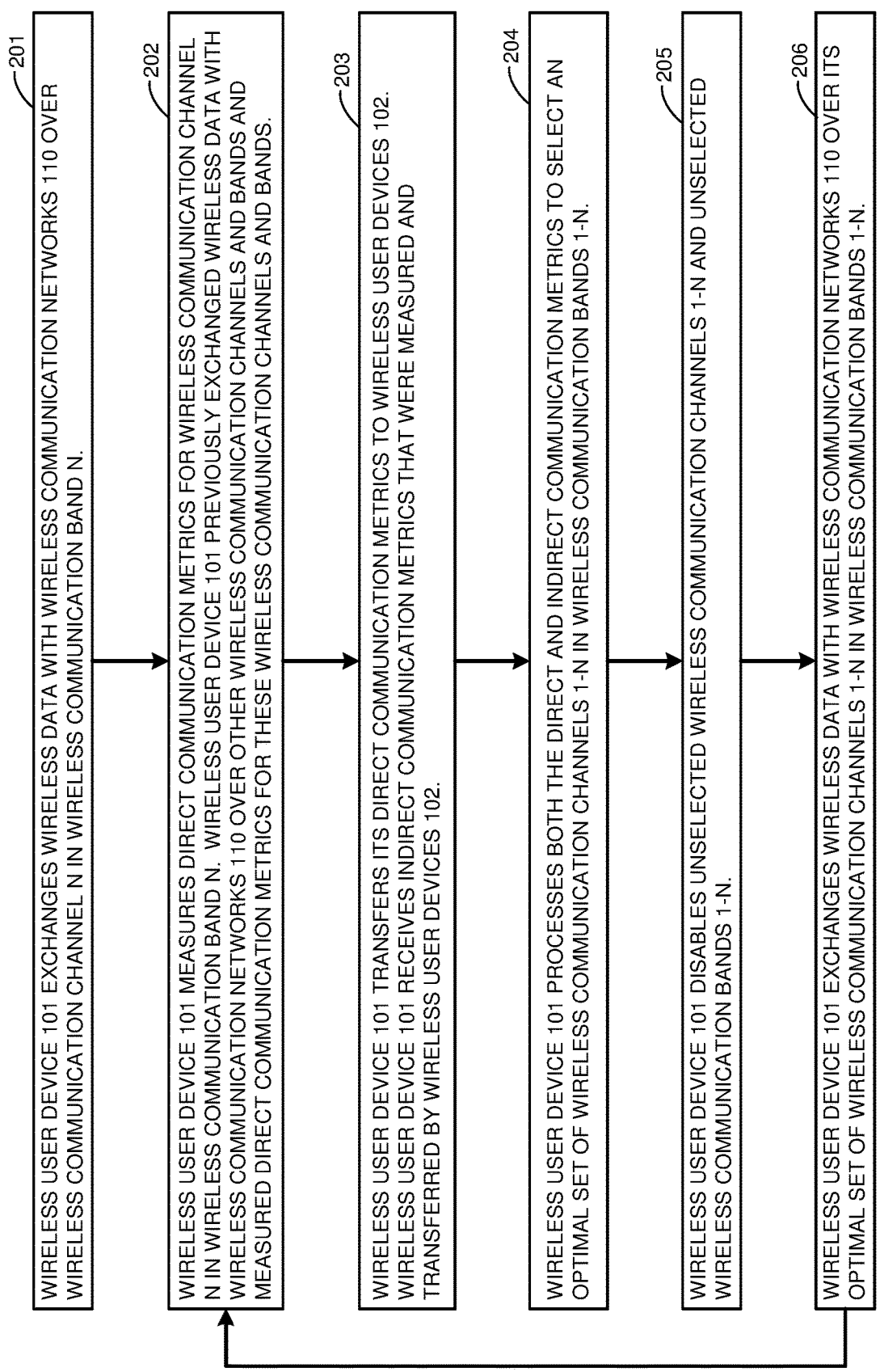
Figure 3:
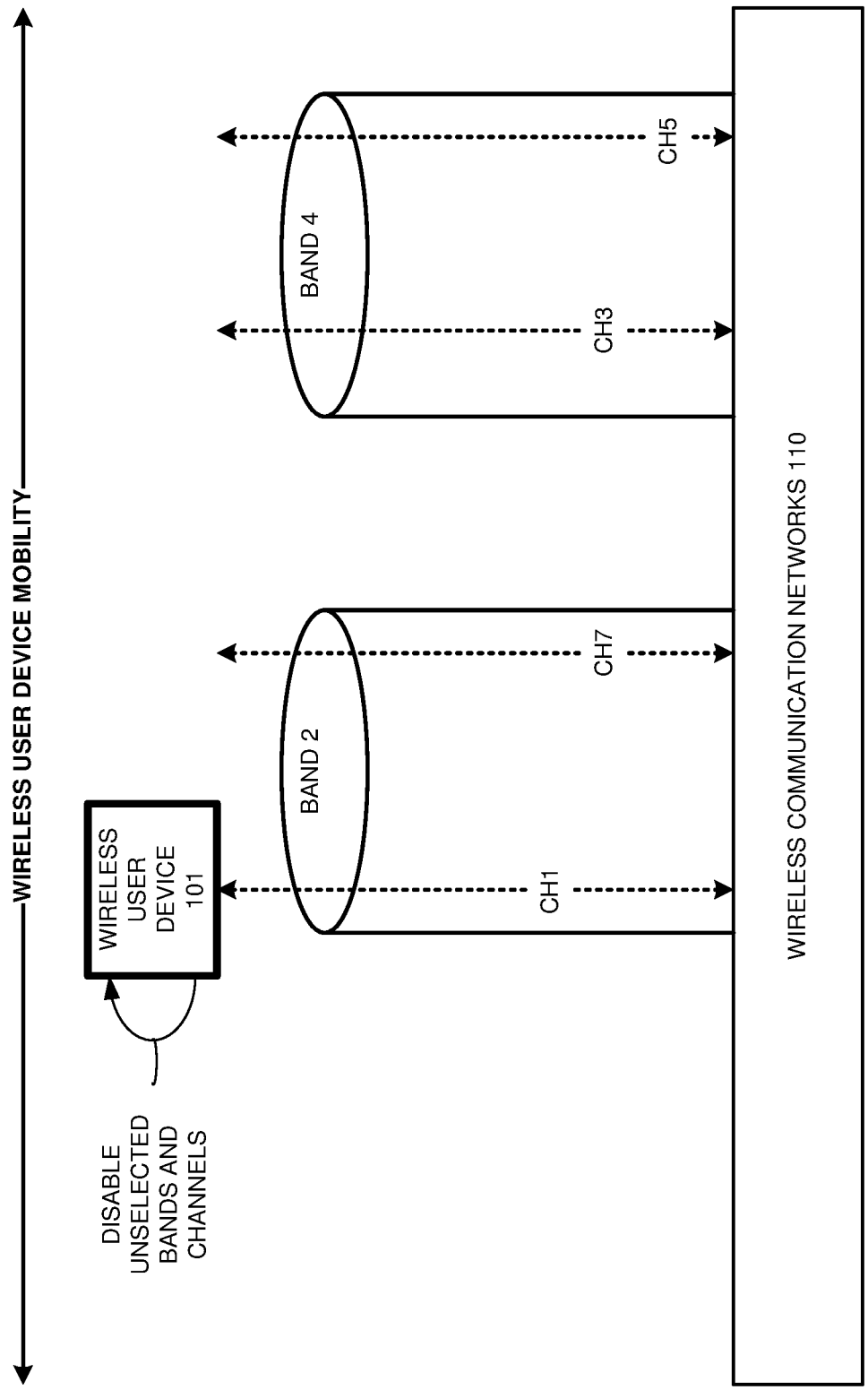

FIGS. 1-3 illustrate wireless user device 101 to communicate over an optimal set of wireless communication channels. Referring to FIG. 1, wireless communication networks 110 communicate with wireless user devices 101-102 over wireless communication bands 1-N that have wireless communication channels (CH) 1-N. Wireless communication bands 1-N typically occupy the Giga-Hertz (GHz) frequency spectrum, and an individual wireless communication channel is usually several Mega-Hertz (MHz) wide. Wireless communication networks 110 deliver wireless data services to wireless user devices 101-102. Exemplary wireless data services include internet access, media conferencing, machine communications, and social networking. Exemplary wireless user devices 101-102 include computers, phones, media players, and machine transceivers.

As indicated by the labeled-arrow, wireless user devices 101-102 move about. As wireless user devices 101-102 move, they use various wireless communication networks 110, wireless bands 1-N, and wireless channels 1-N. Wireless user devices 101-102 are made of computer systems and software. The computer systems have Central Processing Units (CPUs), Random Access Memory (RAM), data storage, Input/Output (I/O) transceivers, and bus interfaces. The CPUs retrieve the software from the memories and execute the software to direct the operation of the user devices. The software comprises modules for operating system, network control, service delivery, user applications, and the like.

Wireless communication networks 110 comprise network elements like wireless access points, data gateways, mobility controllers, and user databases. Wireless user devices 101-102 and wireless communication networks 110 use protocols such as Institute of Electrical and Electronic Engineers (IEEE) 802.11, Long Term Evolution (LTE), IEEE 802.3, Internet Protocol (IP), and/or some other format.

Wireless user devices 101-102 exchange wireless data with wireless communication networks 110 over wireless communication channels 1-N in wireless communication bands 1-N. Wireless user devices 101-102 measure communication metrics for wireless communication channels 1-N in wireless communication bands 1-N. Wireless user devices 101-102 exchange the communication metrics with one another. Wireless user devices 101-102 each process the communication metrics to select an optimal set of the wireless communication channels 1-N in the wireless communication bands 1-N. Wireless user devices 101-102 each disable their unselected wireless communication channels 1-N in wireless communication bands 1-N. Wireless user devices 101-102 each exchange wireless data with wireless communication networks 110 over their own optimal set of wireless communication channels 1-N in wireless communication bands 1-N.

Referring to FIG. 2, the operation of wireless user device 101 is described. Wireless user device 101 exchanges wireless data with wireless communication networks 110 over wireless communication channel N in wireless communication band N (201). Wireless user device 101 measures direct communication metrics for wireless communication channel N in wireless communication band N (202). Exemplary metrics include signal strength, signal quality, data latency, jitter, media coding, and the like. Previously, wireless user device 101 exchanged wireless data with wireless communication networks 110 over other wireless communication channels and bands and measured direct communication metrics for these other wireless communication channels and bands.

Wireless user device 101 transfers its direct communication metrics to wireless user devices 102 (203). Wireless user device 101 receives indirect communication metrics that were measured and transferred by wireless user devices 102 (203). The exchange of communication metrics among wireless user devices 101-102 typically occurs through an aggregation database, but wireless user devices 101-102 may also use public wireless links, wireless near field communications, Long-Term Evolution (LTE) Device-to-Device (D2D) communications, Short Message Service (SMS), and the like.

Wireless user device 101 processes both the direct and indirect communication metrics to select an optimal set of wireless communication channels 1-N in wireless communication bands 1-N (204). The optimal channel selection process selects the wireless communication channels that have the best moving-average signal quality in the geographic areas traversed by wireless user device 101 in the recent past. For example, wireless user device 101 may select wireless communication channels 1 and 7 in wireless communication band 2 and wireless communication channels 3 and 5 in wireless communication band 4.

Wireless user device 101 disables the unselected wireless communication channels 1-N and any unselected wireless communication bands 1-N (205). To disable the unselected wireless communication channels, wireless user device 101 may remove the unselected wireless communication channels from the radio measurement reports and/or the User Equipment (UE) capability messages that wireless user device 101 transfers to wireless communication networks 110. Wireless user device 101 may alternatively transfer Radio Link Failure (RLF) messages for the unselected wireless communication channels to wireless communication networks 110.

Wireless user device 101 exchanges wireless data with wireless communication networks 110 over its optimal set of wireless communication channels 1-N in wireless communication bands 1-N (206). For example, wireless user device 101 and wireless communication network may communicate over optimal wireless communication channels 1 and 7 in wireless communication band 2 and optimal wireless communication channels 3 and 5 in wireless communication band 4. The process returns to operation block 202, although wireless user device 101 will use and measure communication metrics for various wireless communication channels as the process continues.

Referring to FIG. 3, wireless user device 101 selects wireless communication channels 1 and 7 in wireless communication band 2 and wireless communication channels 3 and 5 in wireless communication band 4 for its optimal set of wireless communication channels. Wireless user device 101 disables the other unselected channels that are not in the optimal set of wireless communication channels. Wireless user device 101 and wireless communication networks 110 then communicate over optimal wireless communication channels 1 and 7 in wireless communication band 2 and optimal wireless communication channels 3 and 5 in wireless communication band 4. The specific wireless communication channels and wireless communication bands that are selected for the optimal set will likely change over time as wireless user device 101 moves about and considers additional communication metrics.

Figure 4:
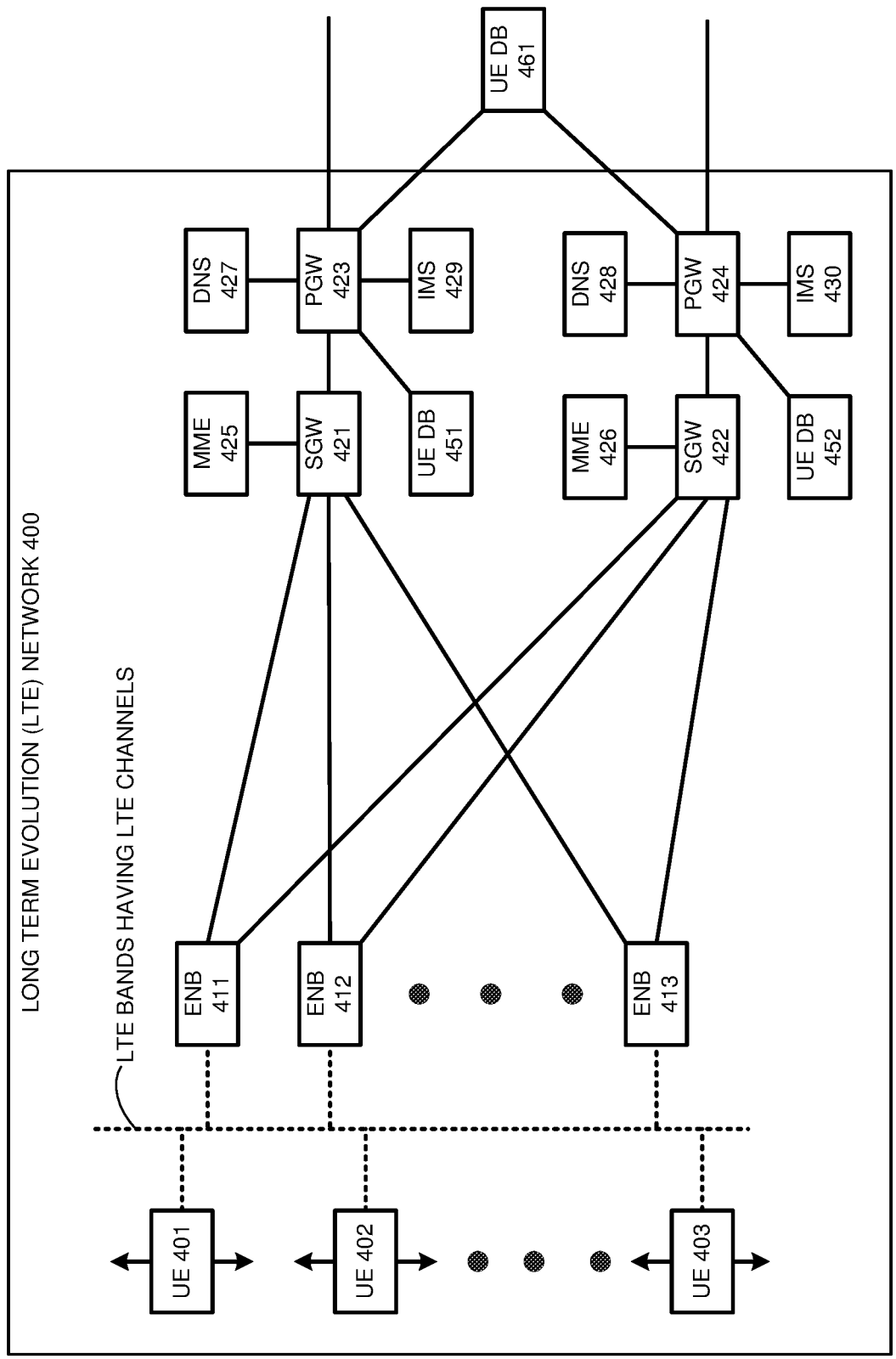
FIG. 4 illustrates a Long Term Evolution (LTE) network having User Equipment (UE) that communicates over an optimal set of LTE channels.

FIG. 4 illustrates a Long Term Evolution (LTE) network 400 having User Equipment (UE) 401 that communicates over optimal LTE bands and channels. LTE network 400 comprises UEs 401-403, eNodeBs 411-413, Serving Gateways (S-GWs) 421-422, Packet Data Network Gateways (P-GWs) 423-424, Mobility Management Entities (MMEs) 425-426, Domain Name Servers (DNS) 427-428, Internet Protocol Multimedia Subsystem (IMS) servers 429-430, and UE databases (DBs) 451-452. UE DB 461 is external to LTE network 400.

ENBs 411-413 communicate with UEs 401-403 over LTE bands that have LTE channels. As indicated by the arrows, UEs 401-403 move about and use various ENBs, LTE bands, LTE channels, Public Mobile Land Networks (PLMNs), and Access Point Names (APNs). UEs 401-403 exchange wireless data with ENBs 401-403 over the LTE bands and channels. UEs 401-403 measure communication metrics for the LTE bands and channels. The communication metrics comprise Channel Quality Index (CQI), Rank Index (RI), Precoding Matrix Index (PMI), ENB ID, PLMN ID, APN, and geographic location.

UEs 401-403 are configured with domain names for UE DB s 451-452 and/or UE DB 461. UEs 401-403 access DNS 427-428 to translate the domain names into IP addresses for UE DBs 451-452 and/or UE DB 461. UEs 401-403 transfer their communication metrics to UE DBs 451-452 and/or UE DB 461. UE DBs 451-452 and/or UE DB 461 average and aggregate the communication metrics by LTE band, LTE channel, ENB ID, PLMN ID, APN, and geographic location. UE DBs 451-452 and/or UE DB 461 transfer the averaged and aggregated communication metrics to UEs 401-403.

UEs 401-403 process the communication metrics to select their own optimal set of LTE bands and channels. To select its optimal LTE channels, the UE selects LTE channels with above-average CQIs in their current geographic area. RI and PMI may also be scored and factored into the channel selection process. For example, if a group of LTE channels have comparable CQI scores, then the LTE channels with the best RI scores and/or PMI scores could be selected.

UEs 401-403 then disable their own unselected LTE channels and possibly entire LTE bands. UEs 401-403 disable the unselected LTE channels by removing the unselected LTE channels from their LTE measurement reports and UE Capabilities messaging that UEs 401-403 transfer to ENBs 411-413. UEs 401-403 also transfer Radio Link Failure (RLF) messages to ENBs 411-413 when they encounter unselected LTE channels. UEs 401-403 then exchange wireless data with ENBs 401-403 over their own optimal set of LTE bands and LTE channels.

Figure 5:
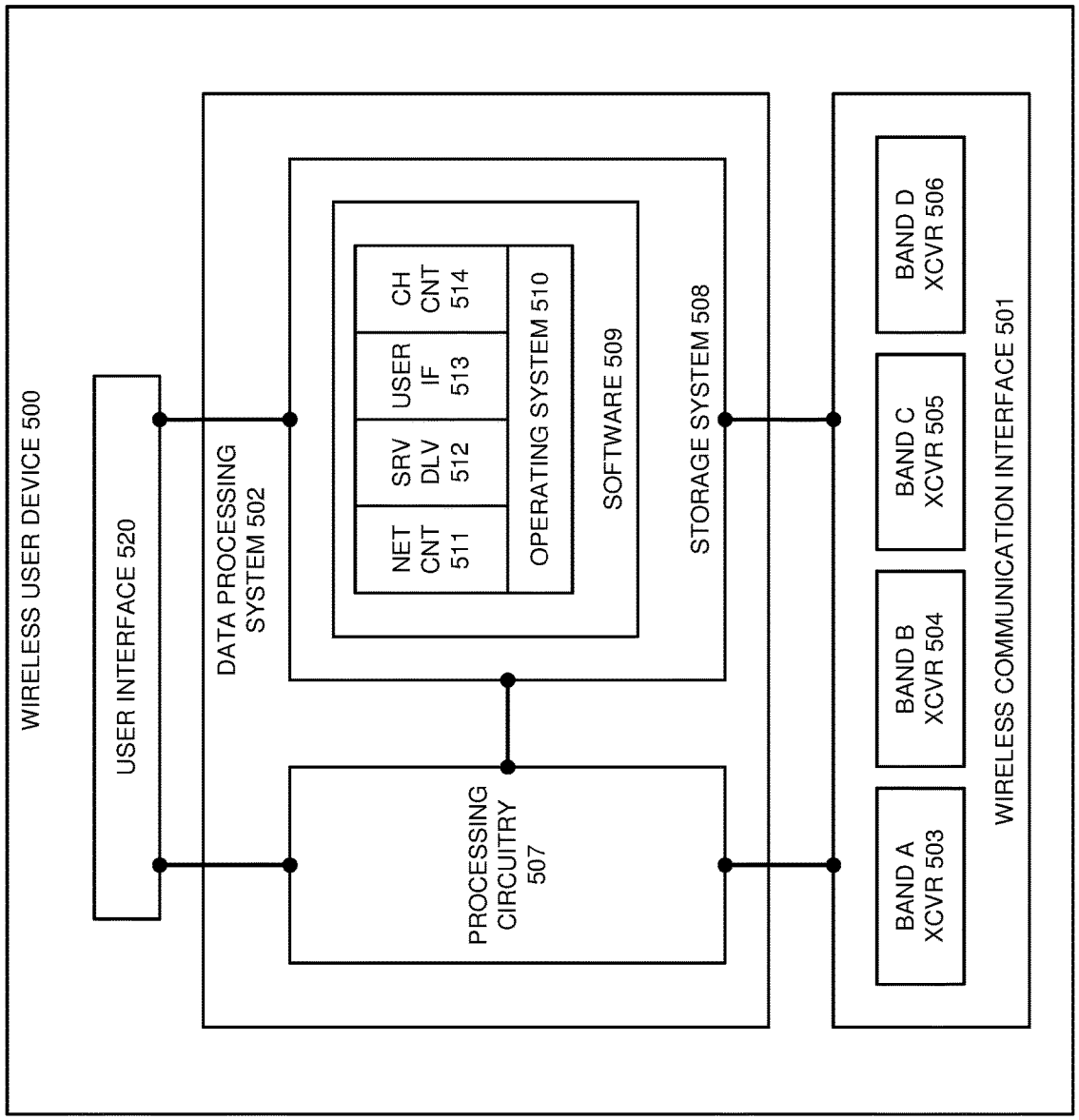
FIG. 5 illustrates a wireless user device that communicates over an optimal set of wireless communication channels.

FIG. 5 illustrates wireless user device 500 that communicates over an optimal set of wireless communication channels. Wireless user device 500 comprises wireless communication interface 501, data processing system 502, and user interface 520. User interface 520 may include a display, touch-surface, speakers, microphone, lights, buttons, and the like although user interface 520 could also be omitted as desired.

Wireless communication interface 501 comprises wireless transceivers (XCVRs) 503-506 for respective wireless communication bands A-D. Wireless XCVRs 503-506 comprise communication components, such as antennas, amplifiers, filters, digital-to-analog interfaces, bus interfaces, memory, software, digital signal processors, and the like. Wireless XCVRs 503-506 measure signal quality and other communication metrics for the wireless communication channels in wireless communication bands A-D.

Data processing system 502 comprises processing circuitry 507 and storage system 508. Storage system 508 stores software 509. Software 509 includes respective software modules 510-514. Processing circuitry 507 comprises CPUs and RAM. Storage system 508 comprises non-transitory, machine-readable, data storage media, such as RAM, flash drives, memory circuitry, and the like. Software 509 comprises machine-readable instructions that control the operation of processing circuitry 507 when executed. User interface 520 comprises components like a touch display, speakers, microphone, lights, and buttons.

When executed by processing circuitry 507, software modules 510-514 direct circuitry 507 to perform the following operations. Operating system 510 interfaces between software modules 511-514 and device 500 hardware. Network control (NET CNT) modules 511 interact with wireless access points and network controllers to obtain wireless data services. Network control modules 511 disable LTE channels as directed by channel control modules 514. Service delivery (SRV DLV) modules 512 direct the wireless data services over transceivers 503-506. User Interface (IF) modules 513 direct interactions through user interface 520. Channel control (CH CNT) modules 514 exchange communication metrics, select wireless communication channels, and direct network control modules 511 to disable the unselected channels.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless user device to communicate over an optimal set of wireless communication channels, the method comprising:
the wireless user device exchanging wireless data with wireless communication networks over the wireless communication channels and responsively measuring direct Channel Quality Indices (CQIs) for the wireless communication channels;
the wireless user device transferring the direct CQIs for the wireless communication channels to a database and receiving indirect CQIs for the wireless communication channels from the database, wherein the database receives the indirect CQIs from other wireless user devices which exchange other wireless data with the wireless communication networks over the wireless communication channels and responsively measure the indirect CQIs for the wireless communication channels;
the wireless user device processing the direct CQIs and the indirect CQIs to select the optimal set of the communication channels;
the wireless user device disabling unselected ones of the wireless communication channels that are not in the optimal set of the communication channels; and
the wireless user device exchanging additional wireless data with the wireless communication networks over the optimal set of the wireless communication channels.

2. The method of claim 1 wherein disabling the unselected ones of the wireless communication channels comprises the wireless user device removing the unselected ones of the wireless communication channels from measurement reports that the wireless user device transfers to the wireless communication networks.

3. The method of claim 1 wherein disabling the unselected ones of the wireless communication channels comprises the wireless user device removing the unselected ones of the wireless communication channels from User Equipment (UE) Capabilities messages that the wireless user device transfers to the wireless communication networks.

4. The method of claim 1 wherein disabling the unselected ones of the wireless communication channels comprises the wireless user device transferring Radio Link Failure (RLF) messages for the unselected ones of the wireless communication channels to the wireless communication networks.

5. The method of claim 1 wherein transferring the direct CQIs to the database and receiving the indirect CQIs from the database comprises the wireless user device transferring the direct CQIs and receiving the indirect CQIs over wireless communication links.

6. The method of claim 1 wherein transferring the direct CQIs to the database and receiving the indirect CQIs from the database comprises the wireless user device transferring the direct CQIs and receiving the indirect CQIs over Long-Term Evolution (LTE) Device-to-Device (D2D) communication links.

7. The method of claim 1 wherein:
measuring and transferring the direct CQIs further comprises the wireless user device measuring and transferring direct Rank Indices (RIs); and
receiving and processing the indirect CQIs further comprises the wireless user device receiving and processing indirect RIs.

8. The method of claim 1 wherein:
measuring and transferring the direct CQIs further comprises the wireless user device measuring and transferring direct Precoding Matrix Indices (PMIs); and
receiving and processing the indirect CQIs further comprises the wireless user device receiving and processing indirect PMIs.

9. A wireless user device to communicate over an optimal set of wireless communication channels, the wireless user device comprising:
a wireless communication transceiver configured to exchange wireless data with wireless communication networks over the wireless communication channels and responsively measure direct Channel Quality Indices (CQIs) for the wireless communication channels;
the wireless communication transceiver configured to transfer the direct CQIs for the wireless communication channels to a database and receive indirect CQIs for the wireless communication channels from the database, wherein the database receives the indirect CQIs from other wireless user devices that exchange other wireless data with the wireless communication networks over the wireless communication channels and responsively measure the indirect CQIs for the wireless communication channels;
a data processing system configured to process the direct CQIs and the indirect CQIs to select the optimal set of the communication channels;
the data processing system configured to disable unselected ones of the wireless communication channels that are not in the optimal set of the communication channels; and
the wireless communication transceiver configured to exchange additional wireless data with the wireless communication networks over the optimal set of the wireless communication channels.

10. The wireless user device of claim 9 wherein the data processing system is configured to remove the unselected ones of the wireless communication channels from measurement reports that the wireless user device transfers to the wireless communication networks.

11. The wireless user device of claim 9 wherein the data processing system is configured to remove the unselected ones of the wireless communication channels from User Equipment (UE) Capabilities messages that the wireless user device transfers to the wireless communication networks.

12. The wireless user device of claim 9 wherein:
the data processing system is configured to initiate Radio Link Failure (RLF) messages for the unselected ones of the wireless communication channels; and
the wireless communication transceiver is configured to transfer the RLF messages to the wireless communication networks.

13. The wireless user device of claim 9 wherein:
the data processing system is configured to initiate a direct CQI transfer over wireless communication links and to process the indirect CQIs from the wireless communication links; and
the wireless communication transceiver is configured to transfer the direct CQIs over the wireless communication links and to receive the indirect CQIs over the wireless communication links.

14. The wireless user device of claim 9 wherein:
the data processing system is configured to initiate a direct CQI transfer over Long-Term Evolution (LTE) Device-to-Device (D2D) communication links and to process the indirect CQIs from the LTE D2D communication links; and
the wireless communication transceiver is configured to transfer the direct CQIs over the LTE D2D communication links and to receive the indirect CQIs over the LTE D2D communication links.

15. The wireless user device of claim 9 wherein:
the wireless communication transceiver is further configured to measure and transfer direct Rank Indices (RIs) and to receive indirect RIs; and
the data processing system is further configured to initiate the direct RI transfer and to process the indirect RIs to select the wireless communication channels.

16. The wireless user device of claim 9 wherein:
the wireless communication transceiver is further configured to measure and transfer direct Precoding Matrix Indices (PMIs) and to receive indirect PMIs; and
the data processing system is further configured to initiate the direct PMI transfer and to process the indirect PMIs to select the wireless communication channels.

* * * * *